Aug. 28, 1962  E. RICHERT ETAL  3,051,333
STORAGE APPARATUS FOR ARTICLE SORTING SYSTEM
Filed July 13, 1959  2 Sheets-Sheet 1

INVENTORS.
EBERHARD RICHERT
BY HORST FLIEGNER

ATTORNEY

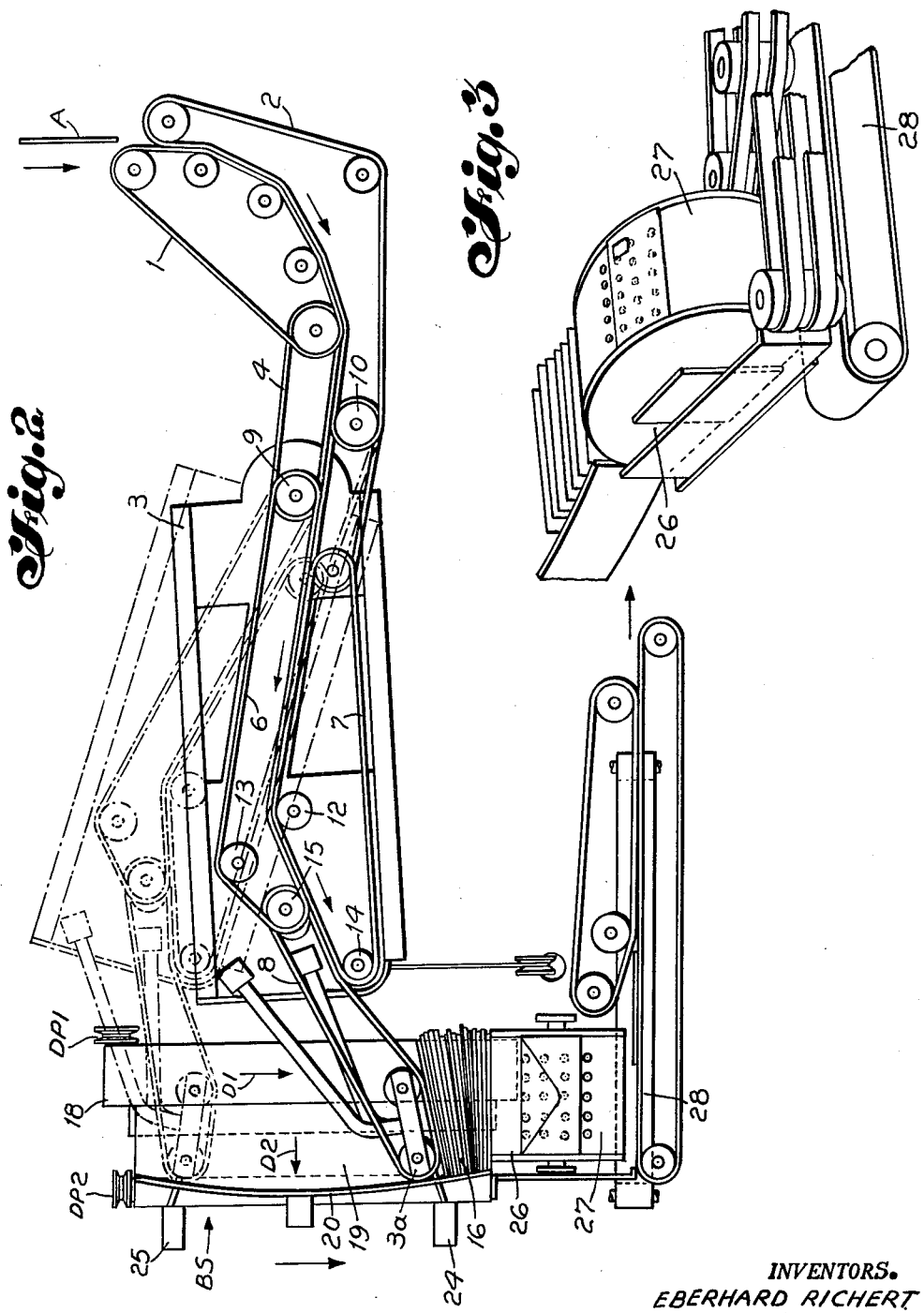

United States Patent Office 3,051,333
Patented Aug. 28, 1962

3,051,333
STORAGE APPARATUS FOR ARTICLE SORTING SYSTEM
Eberhard Richert, Berlin-Steglitz, and Horst Fliegner, Berlin-Lankwitz, Germany, assignors to International Standard Electric Corporation, New York, N.Y., a corporation of Delaware
Filed July 13, 1959, Ser. No. 826,613
Claims priority, application Germany July 31, 1958
2 Claims. (Cl. 214—7)

This invention relates to material handling equipment and more particularly to edgewise conveying systems of the kind in which the receiving station is continuously furnished with dispatch articles irrespective of the speed at which these are consigned to the sending station. In respect of these systems it is known to use a balancing or buffer storer to which flat articles such as post letters or cards can be dispatched from the sending station at any speed, but will nevertheless be supplied to the receiving station uniformly. The sending station may forward the articles singly and at any speed, and need not provide a continuous flow thereof, whereas the articles move from the storer toward the receiving station at a uniform speed and are spaced at certain minimum distances apart. In fact, the receiving station may be an apparatus by which the articles shall be treated in some respect and whose mode of operation requires the flow of these to be uniform and, in order to insure a high degree of economy, also requires them to arrive in a certain predetermined rhythm. Furthermore, the supply to the receiving station should be possible to interrupt. In particular, arrangements of this design will be useful for delivering post letters and cards to conveying systems that serve the sorting and further treatment thereof.

The invention deals with conveying systems for flat articles travelling on edge, that is in upright position, namely, conveying systems of the kind in which the articles are delivered from the sending station at any speed and come to be stacked in a balancing or buffer storer, whereupon they are transferred in a continuous flow to the receiving station. The invention particularly concerns the construction and mode of action of the means associated with such a storer and having to bring about the desired effect.

According to the invention the conveying path contains that balancing storer and may hence be said to be interrupted, being divided by the storer into an incoming section and an outgoing one. The storer is associated with an apparatus for continuously charging the conveying section outgoing from the storer with the articles stacked in this. Near the storer, either the incoming conveying section or the outgoing one, preferably, as shown, the section incoming to the storer, is associated with a turnable or displaceable arm on which the conveyor belts of the conveying section from the sending station are mounted. This arm is arranged to bear against the stack of articles between it and the charging apparatus for the conveying section outgoing from the storer. This apparatus comprises a pulling-off device of any kind such as a device by which the articles are sucked up and then delivered to the outgoing conveying section. Such pulling-off devices are well known per se and, therefore, need not be explained here more fully. By the outgoing conveying section the articles will be led to the receiving station continuously and spaced at equal distances apart.

The above-mentioned and other features and objects of the invention and the manner of attaining them will become more apparent and the invention itself will be best understood by reference to the following description of an embodiment of the invention taken in conjunction with the accompanying drawings in which:

FIG. 2 is a plan view of a second embodiment similar to that shown in FIG. 1 but having a turn-over device also constituting the pulling-off device; and FIG. 3 is a perspective view of a turn-over device as represented in FIG. 2.

Figure 1:
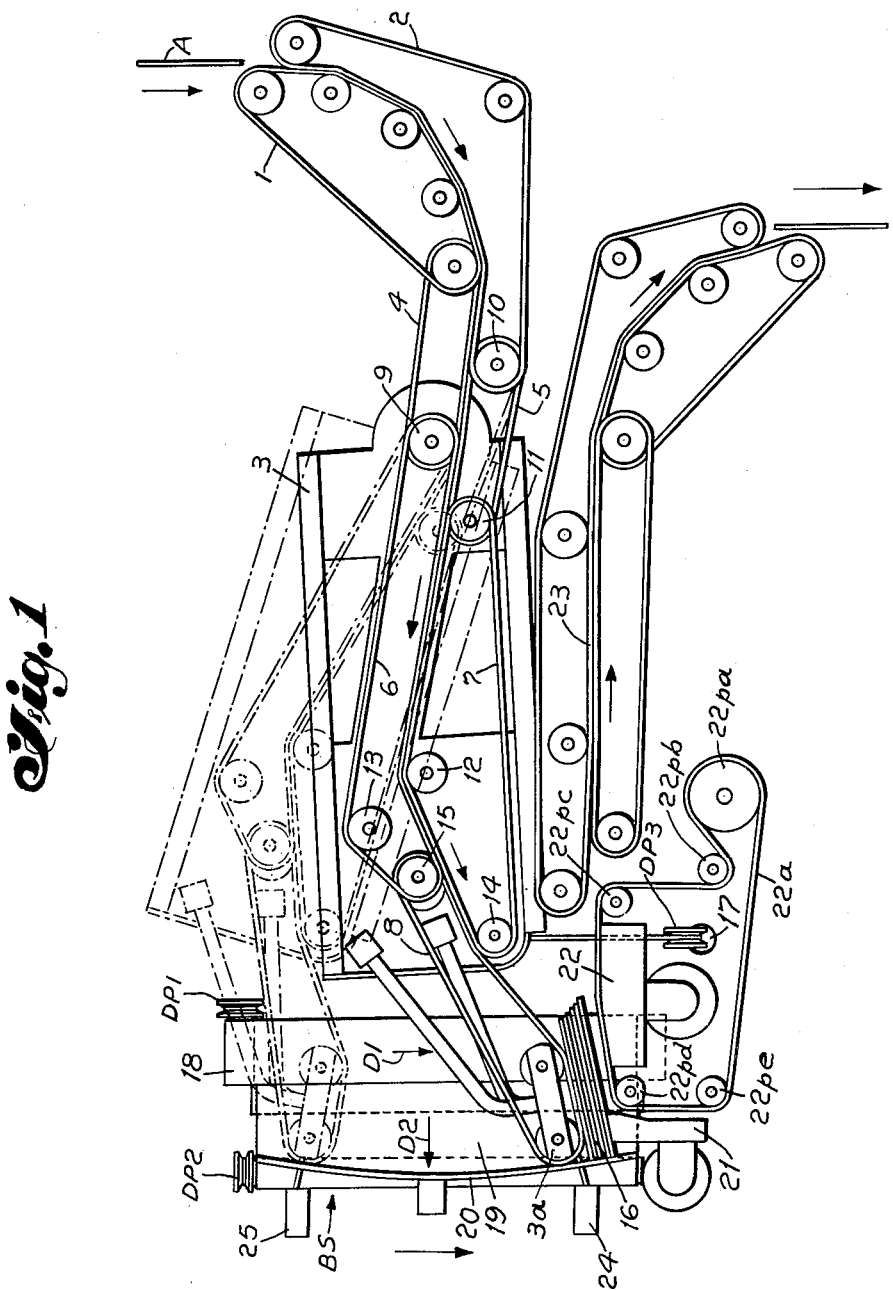
FIG. 1 is a plan view of a first embodiment thereof that has a holding nozzle and a pulling-off device for the stacked articles.

Referring now to FIG. 1, there is shown a plan view of a balancing storer, BS, which is fed by two conveying belts 1, 2. This method of conveying articles is of the type wherein the articles to be conveyed are clamped between two belts with opposed faces to run parallel to each other. As will be understood from FIG. 1, belts 1, 2 lead the articles A to belts 4, 5, 6, 7, 8 mounted on pivoting arm 3 by means of rollers 9, 11, 12, 13, 14, 15. A rigid arm 3 with these rollers and belts on it is turnable about the center of roller 9. The said belts are arranged to deliver the articles into the storer, which comprises two endless belts 18, 19 and a curved fixed wall 20. The belts 18, 19 form the bottom of the storer and are positioned at right angles with respect to each other. They are driven in the manner of conveying belts. To illustrate this, each of them is shown as fitted with a drive pulley DP1, DP2, respectively. The directions in which these belts are driven are indicated by arrows D1, D2, respectively. The rollers 9, 11, 12, 13, 14, 15 are so positioned on pivoting arm 3 that owing to the move of the respective conveying belts, the arm 3 always bears against the stack 16 of letters A. With the aid of an adjustable weight 17 which hangs over pulley DP3, by which the arm 3 is drawn toward stack 16 in the storer, the pressure exerted by arm 3 can be adjusted still more finely. In FIG. 1 the solid-line position of arm 3 corresponds to a minimum thickness of stack 16, that is, to a minimum filling-degree of the storer, whereas the dot-and-dash line position corresponds to a maximum thickness of the stack, that is, to a maximum filling-degree of the storer.

The endless belt 18 operates with its upper run toward the pulling-off device 22, while the belt 19 operates with its upper run toward the wall 20, this wall acting as a stop for the letters fed into the storer. By these two belts the letters upright on them will be led toward the left and bottom of FIG. 1 toward a suction-operated holding nozzle 21 of the pulling-off device 22 for the letters. A perforated belt 22a rotates about the system of pulleys 22pa . . . 22pe and is known from the prior art. The belts 18, 19 also prevent the device 22 from sucking against it several letters simultaneously. To cause letters to be taken from the stack 16 at regular predetermined intervals to provide a uniform rate of output along the outgoing section 23, the holding nozzle 21 may have a reduced suction applied to it at regular intervals. This will allow the suction of the belt 22a to overcome the suction of the holding nozzle 21 and a letter will be thus fed along the belt 22a and out through belt 23. Alternately, the suction provided to suction manifold 22 which cooperates with the perforated belt 22a, may be increased over the suction applied to the holding nozzle 21. At the moments when increased suction is applied to the manifold 22, a letter will be pulled away from the holding nozzle 21 and carried by the belt 22a to the output path 23. These techniques in themselves are well known in the prior art.

In order to facilitate the inserting of the letters into the storer and also to facilitate the process of pulling them from off the stack 16, this stack is brought to perform what may be called a "respiratory" motion. This motion is accomplished by the belt roller 15 being provided with an eccentric enlargement by which the arm 3 will be alternately removed somewhat from the stack and then again pressed against it in the rhythm of roller 15 revolving. The eccentric shape of the belt roller 15 causes the tension on the belts such as belts 6, 7 and 8 to be alternately increased and decreased. As the large part of the eccentric roller 15 engages the belt the tension is increased, then the tension is caused to be decreased as the smaller part of the roller 15 engages the belts. The rapid alternating increases and decreases in tension on the belts 6, 7 and 8 causes the entire arm 3 to shake or vibrate and this causes the vibrating action of the member 3a which is pressing against the stack of letters 16.

With the aid of arm 3 and the pulling-off device 22 the letters will be supplied uniformly to the outgoing conveying belt 23 and independently of the process by which the letters from the sending station are supplied to the storer or stacker 18, 19, 20. Also, the thickness of the letters and their dimensions are allowed to differ from one another as long as the growing stack permits them to be added to it. In this way, differences as to quantity between the work done by the incoming conveying section 1, 2, 4, 5, 6, 7, 8, 9 and that done by the outgoing conveying section 23 will be balanced within the capaciousness of the storer.

With a minimum filling-degree of the storer, the delivery of letters to the receiving station can be stopped by a low limit switch 24. As soon as a sufficient quantity of letters have been fed into the storer, the delivery from this restarts. Similarly, with a maximum filling-degree the arrival of letters can be stopped by a high limit switch 25 and remain so till the stack 16 has decreased. With the switches 24, 25 out of operation the stack varies slowly in proportion to the difference between the incoming and the outgoing performances of conveyance. The switches 24, 25 are actuated by the extension 3a of arm 3.

The storer thus regulates its filling-degree automatically in a manner to eliminate any manual work. If the storer be large enough to comply with the incurred differences between the incoming and the outgoing conveying operations, the switches 24, 25 will be actuated but seldom.

In the equipment according to FIGS. 2 and 3 the letters are supplied to the storer and stacked in it in the manner described for FIG. 1. But instead of the suction-operated pulling-off appliance 21, 22 there shown, in which the letters are sucked against plane parts of a perforated suction belt, FIGS. 2 and 3 represent an arcuate pulling-off device 26 that has a perforated suction belt 27, FIG. 3, carried by rollers mounted horizontally, whereas the rollers of the perforated belt shown in FIG. 1 are mounted vertically. 28 denotes part of the conveying belt section outgoing from the storer.

The equipment according to FIGS. 2 and 3, will be of special importance when employed in mail assorters. In fact, the letters arriving from the stamping machine are generally in such a position that they must be turned through 180° about their longitudinal axes in order that their destination may be in proper position for reading. As will be understood particularly from FIG. 3, the pulling-off device shown in FIGS. 2 and 3 acts to turn each letter through this angle of 180°, so each letter when reaching the out-going conveying section 28 will be in proper position. The speed of this section should be so reduced that it may be possible for the destinations to be read with safety. The pulling-off device 26, 27 should be so dimensioned that the letters transferred by conveyor 28 to the receiving station may be spaced at certain minimum distances apart.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. Equipment for use in edgewise conveying systems employed to deliver flat articles continuously to a receiving station comprising a storer adapted to receive articles at random times, outgoing edgewise conveyor means in communication with a portion of said storer to remove stored articles therefrom periodically, said storer comprising means for stacking said articles on edge, means for urging said articles towards said outgoing edgewise conveyor means and means for singly delivering said articles from the stack to said outgoing conveyor means, said means for stacking said articles comprising a pivoted conveyor belt system, said pivoted conveyor system including a pivoted arm having an axis corresponding to the axis of pivoting of said belt system, a plurality of belt rollers mounted on said arm for cooperation with said belt system and means for normally urging said pivoted arm toward said outgoing edgewise conveyor means, said equipment further comprising a curved stop wall having a radius equal to the length of the run of said pivoted belt system disposed to cooperate with said pivoted conveyor system, a first endless belt extending the length of said storer and movable in a direction substantially parallel to the direction of said means for singly delivering said articles and in a direction toward said curved stop wall, a second endless belt extending the length of said storer and movable in a direction substantially perpendicular to said first belt system said direction being such as to urge said articles towards said means for delivering said articles.

2. Equipment according to claim 1 wherein one of the rollers mounted on said pivoted arm is provided with an eccentric enlargement, at least one of the belts of said pivoted conveyor belt system passing over said eccentric roller whereby said pivoted arm is caused to be vibrated against said stacked articles.

References Cited in the file of this patent

UNITED STATES PATENTS

| | | |
|---|---|---|
| Re. 20,541 | Staude | Oct. 24, 1937 |
| 1,072,388 | Madigan et al. | Sept. 2, 1913 |
| 1,120,983 | Sigafoos | Dec. 15, 1914 |
| 2,779,592 | Hartman | Jan. 29, 1957 |
| 2,807,390 | Bonebrake | Sept. 24, 1957 |